United States Patent
Suzuki

(10) Patent No.: US 11,112,386 B2
(45) Date of Patent: Sep. 7, 2021

(54) ULTRASONIC TESTING METHOD, SYSTEM, PROGRAM, AND STORAGE MEDIUM

(71) Applicant: Mitsubishi Power, Ltd., Yokohama (JP)

(72) Inventor: Yutaka Suzuki, Tokyo (JP)

(73) Assignee: Mitsubishi Power, Ltd., Yokohama (JP)

( * ) Notice: Subject to any disclaimer, the term of this patent is extended or adjusted under 35 U.S.C. 154(b) by 0 days.

(21) Appl. No.: 16/414,842

(22) Filed: May 17, 2019

(65) Prior Publication Data

US 2019/0353622 A1   Nov. 21, 2019

(30) Foreign Application Priority Data

May 21, 2018 (JP) .............................. JP2018-097352

(51) Int. Cl.
*G01N 29/26* (2006.01)
*G01N 29/04* (2006.01)

(52) U.S. Cl.
CPC ......... *G01N 29/262* (2013.01); *G01N 29/043* (2013.01)

(58) Field of Classification Search
CPC .... G01N 29/262; G01N 29/043; G01N 29/12; G01N 29/04; G01N 29/2456
See application file for complete search history.

(56) References Cited

U.S. PATENT DOCUMENTS

| | | | | |
|---|---|---|---|---|
| 4,170,142 A | * | 10/1979 | Posakony | ............. B06B 1/0622 367/105 |
| 5,024,094 A | * | 6/1991 | Kubota | ............... G01S 7/52049 73/620 |
| 5,117,697 A | * | 6/1992 | Takishita | ............. G10K 11/345 73/626 |

(Continued)

FOREIGN PATENT DOCUMENTS

| | | |
|---|---|---|
| JP | 2014-106130 A | 6/2014 |
| JP | 2016-161423 A | 9/2016 |
| KR | 10-2011-0139643 A | 12/2011 |

OTHER PUBLICATIONS

Korean-language Office Action issued in Korean Application No. 10-2019-0056833 dated May 19, 2020 with English translation (five pages).

(Continued)

*Primary Examiner* — Helen C Kwok
(74) *Attorney, Agent, or Firm* — Crowell & Moring LLP

(57) ABSTRACT

A sensor 30 including a plurality of elements 31 is divided into a plurality of regions 1 and 2. A UT device 20 is connected to each region of the sensor 30 via a switch 40. At least one region of the sensor 30 used for UT is selected for each flaw detection point according to a positional relation of the flaw detection point to the sensor 30. The UT device is connected to the selected at least one region of the sensor 30 by the switch 40. For a flaw detection point for which one region is selected, UT is performed by using the selected one region. For a flaw detection point for which a (Continued)

plurality of regions are selected, a necessary number of times of ultrasonic testing are performed according to a number of the regions by using the selected plurality of regions, and the results are subjected to addition processing.

5 Claims, 9 Drawing Sheets

(56) References Cited

U.S. PATENT DOCUMENTS

| | | | | |
|---|---|---|---|---|
| 5,357,962 | A * | 10/1994 | Green | G01S 7/52049 600/443 |
| 6,685,645 | B1 * | 2/2004 | McLaughlin | A61B 8/08 600/447 |
| 10,746,707 | B2 * | 8/2020 | Suzuki | G01N 29/221 |
| 2006/0219013 | A1 * | 10/2006 | Baba | G01N 29/069 73/618 |
| 2010/0101326 | A1 * | 4/2010 | Iizuka | G01N 29/262 73/588 |
| 2010/0106431 | A1 * | 4/2010 | Baba | G01N 29/04 702/39 |
| 2010/0251821 | A1 * | 10/2010 | Mizota | G01N 29/262 73/602 |
| 2011/0164033 | A1 * | 7/2011 | Kitazawa | G01N 29/262 345/419 |
| 2011/0319764 | A1 | 12/2011 | Okada et al. | |
| 2012/0216617 | A1 * | 8/2012 | Hoctor | G01N 29/262 73/602 |
| 2013/0083628 | A1 * | 4/2013 | Qiao | G01S 15/8927 367/87 |
| 2015/0053012 | A1 * | 2/2015 | Suzuki | G01N 29/26 73/618 |
| 2015/0192412 | A1 * | 7/2015 | Ozeki | G01N 29/28 73/627 |
| 2016/0109411 | A1 * | 4/2016 | Pellegrino | G01N 29/44 702/39 |
| 2016/0116578 | A1 * | 4/2016 | Kim | G01S 7/5205 367/13 |
| 2016/0238567 | A1 * | 8/2016 | Takemoto | G01N 29/262 |
| 2018/0003819 | A1 * | 1/2018 | Koptenko | G01S 15/8927 |
| 2018/0128784 | A1 * | 5/2018 | Kannajosyula | G01N 29/44 |
| 2019/0011554 | A1 * | 1/2019 | Greco | G01S 15/8979 |
| 2019/0064120 | A1 * | 2/2019 | Yamamoto | G01N 29/0645 |
| 2019/0170701 | A1 * | 6/2019 | Yamamoto | G01N 29/2437 |

OTHER PUBLICATIONS

Korean-language Office Action issued in Korean Application No. 10-2019-0056833 dated Nov. 25, 2020 with English translation (8 pages).

* cited by examiner

Fig.8

| DISTANCE / ANGLE | 25 | 50 | 75 | 100 |
|---|---|---|---|---|
| 0 | REGION1 | REGION1 + REGION2 | REGION1 + REGION2 + REGION3 | REGION1 + REGION2 + REGION3 |
| 10 | REGION2 | REGION1 + REGION2 | REGION1 + REGION2 + REGION3 | REGION1 + REGION2 + REGION3 |
| 20 | REGION3 | REGION2 + REGION3 | REGION1 + REGION2 + REGION3 | REGION1 + REGION2 + REGION3 |
| 30 | REGION3 | REGION2 + REGION3 | REGION1 + REGION2 + REGION3 | REGION1 + REGION2 + REGION3 |

ULTRASONIC TESTING METHOD, SYSTEM, PROGRAM, AND STORAGE MEDIUM

BACKGROUND OF THE INVENTION

1. Field of the Invention

The present invention relates to a UT method and the like for performing phased array ultrasonic testing (ultrasonic testing will hereinafter be referred to as UT).

2. Description of the Related Art

Phased array UT adjusts timings in which a plurality of ultrasonic elements (hereinafter elements) included in an array sensor (hereinafter a sensor) transmit ultrasonic waves, and thereby changes a point (focus) that the ultrasonic waves transmitted from the respective elements reach simultaneously (see JP-2014-106130-A). Each of the elements of the sensor is connected to a transmitting circuit (pulser) included in a phased array UT device (hereinafter a UT device). Each element transmits an ultrasonic wave by being driven by the connected pulser. Data on time differences (delay times) between starts of ultrasonic wave transmission of one group of ultrasonic elements is written to the UT device at one time, and the UT device sequentially performs UT at each written delay time.

SUMMARY OF THE INVENTION

Some large-sized sensors have a larger number of elements than the number of terminals of an ordinary general-purpose UT device. In a case of using such a large-sized sensor, UT using all of the elements of the large-sized sensor can be performed by preparing a dedicated large-sized UT device having terminals whose number is equal to or more than the number of elements of the sensor. However, it is inefficient to prepare such a large-sized UT device according to the sensor as needed. Accordingly, the plurality of elements constituting the large-sized sensor may be connected to each terminal of a general-purpose UT device via a switch. In this case, UT utilizing all of the elements of the large-sized sensor can be performed by dividing the large-sized sensor into a plurality of regions, switching the regions connected to the UT device by the switch, and thereby changing the regions transmitting and receiving ultrasonic waves in order.

However, in the case where the general-purpose UT device having a smaller number of terminals than the number of elements is connected to the large-sized sensor via the switch, a number of times of UT which number is the square of the number of divided regions of the sensor need to be performed for a same focus in order to obtain a detection sensitivity equal to that in the case where the large-sized UT device is used. This is because for the same focus, UT that transmits an ultrasonic wave from one region and receives a reflected wave in one region needs to be performed a number of times corresponding in number to combinations of ultrasonic wave transmitting regions and ultrasonic wave receiving regions. Therefore, the number of focuses (in other words, a flaw detection range) for which flaw detection can be performed with one group of delay times written to the UT device at one time is decreased to one divided by the square of the number of divided regions of the sensor. That is, a number of delay times which number is the square of the number of divided regions of the sensor need to be written to the UT device in order to perform UT with a theoretically equal inspection sensitivity for regions equal to those in the case where the large-sized UT device is prepared. Even when UT is performed for the same flaw detection range, the number of times of writing of delay times to the UT device is increased as compared with a case where the large-sized UT device is prepared, and a required time of UT tends to be longer.

It is an object of the present invention to provide a UT method and the like that can efficiently perform UT by a large-sized sensor while using a general-purpose UT device.

In order to achieve the above object, according to the present invention, there is provided an ultrasonic testing method including: dividing an array sensor including a plurality of ultrasonic elements into a plurality of regions; connecting a phased array ultrasonic testing device to each region of the array sensor via a switch; selecting at least one region of the array sensor used for ultrasonic testing from the plurality of regions for each flaw detection point according to a positional relation of the flaw detection point to the array sensor; connecting the phased array ultrasonic testing device to the selected at least one region of the array sensor by the switch; for a flaw detection point for which one region is selected, performing ultrasonic testing by using the selected one region; and for a flaw detection point for which a plurality of regions are selected, performing a necessary number of times of ultrasonic testing according to a number of the regions by using the selected plurality of regions, and adding UT results.

According to the present invention, UT by a large-sized sensor can be performed efficiently while a general-purpose UT device is used.

BRIEF DESCRIPTION OF THE DRAWINGS

FIG. 8 is a diagram depicting an example of an interface screen depicting sensor usage regions set by the controller included in the UT system according to the embodiment of the present invention.

DESCRIPTION OF THE PREFERRED EMBODIMENTS

Embodiments of the present invention will hereinafter be described with reference to the drawings.

—Phased Array UT—

Description will first be made of basic principles of phased array UT (phased array ultrasonic testing).

Figure 1A:
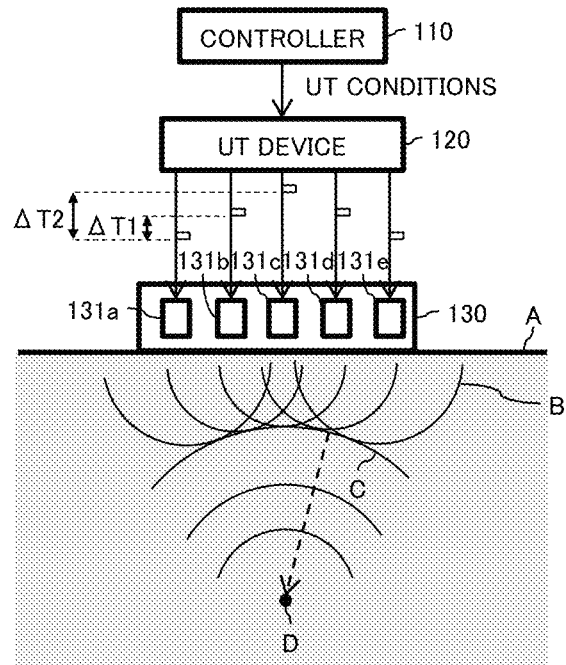
FIG. 1A is a diagram depicting a state of transmission of ultrasonic waves in phased array UT.

FIG. 1A is a diagram depicting a state of transmission of ultrasonic waves in phased array UT. As depicted in the figure, a sensor (array sensor) 130 is installed and fixed on the surface of an object A under inspection. The sensor 130 is provided with a plurality of elements (five elements in the figure) (ultrasonic elements) 131a to 131e such as piezoelectric elements or the like. The elements 131a to 131e are individually connected to a plurality of pulsers (not depicted) included in a UT device (phased array UT device) 120. The elements 131a to 131e are driven by voltage signals output from the pulsers for a short time (fixed time), and thereby transmit ultrasonic waves B. The UT device 120 is connected to a controller 110 such as a PC or the like. The UT device 120 is provided with a delay circuit. The delay circuit shifts a time (timing) at which each pulser starts to output a voltage according to one group of UT conditions written to a memory of the UT device 120 by the controller 110. The UT conditions input from the controller 110 to the UT device 120 are data on differences between times at which the elements 131 start to transmit the ultrasonic waves B, that is, delay times for forming a composite wave front C (to be described later) that converges to a desired focus (flaw detection point) D. FIG. 1A illustrates an example in which the elements 131b and 131d transmit ultrasonic waves B a time $\Delta T1$ after the elements 131a and 131e simultaneously transmit ultrasonic waves B, and the element 131c transmits a ultrasonic wave B a time $\Delta T2(>\Delta T1)$ after the elements 131a to 131e simultaneously transmit the ultrasonic waves B. All and $\Delta T2$ are the data on the delay times (UT conditions). The delay times are set according to the position of the focus D such that the respective ultrasonic waves B transmitted from the elements 131a to 131e reach the focus D as a target at the same time. Sound pressure at the focus D is improved when the respective ultrasonic waves B transmitted from the elements 131a to 131e reach at the same time. A specified flaw detection part within the object A under inspection can be scanned by sequentially executing the plurality of UT conditions included in one group of UT conditions and changing the focus D.

Figure 1B:
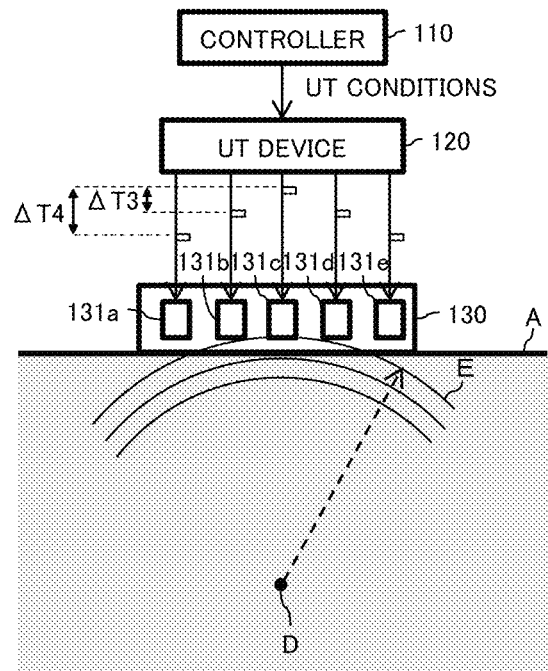
FIG. 1B is a diagram depicting a state of reception of a reflected wave in phased array UT.

FIG. 1B is a diagram depicting a state of reception of a reflected wave in phased array UT. Distances from the focus D (the figure illustrates a case where there is a reflecting source at the focus D) to the elements 131a to 131e differ. There are thus differences between times at which an ultrasonic wave (reflected wave) reflected from the focus D reaches the respective elements 131a to 131e. The UT device 120 therefore increases reception strength by adding the strength signals of reflected waves received by the respective elements 131a to 131e in consideration of differences between the distances from the focus D. FIG. 1A and FIG. 1B illustrate an example in which the elements 131b and 131d receive the reflected wave E a time $\Delta T3$ after the element 131c first receives the reflected wave E at time T0, and the elements 131a and 131e receive the reflected wave E a time $\Delta T4(>\Delta T3)$ after the element 131c first receives the reflected wave E at time T0. In this case, the UT device 120 adds the signals received by the elements 131b and 131d after the passage of the time $\Delta T3$ and the signals received by the elements 131a and 131e after the passage of the time $\Delta T4$ to the signal received by the element 131c at time T0, and outputs a result of this addition as flaw detection data to the controller 110. This processing is performed by the delay circuit included in the UT device 120 on the basis of the UT conditions.

As described above, phased array UT is characterized in that detection sensitivity for the flaw detection point is improved by controlling the delay times so as to increase the strength of the ultrasonic waves at the flaw detection point (the focus D) and the reception strength of the reflected wave.

Figure 2A:
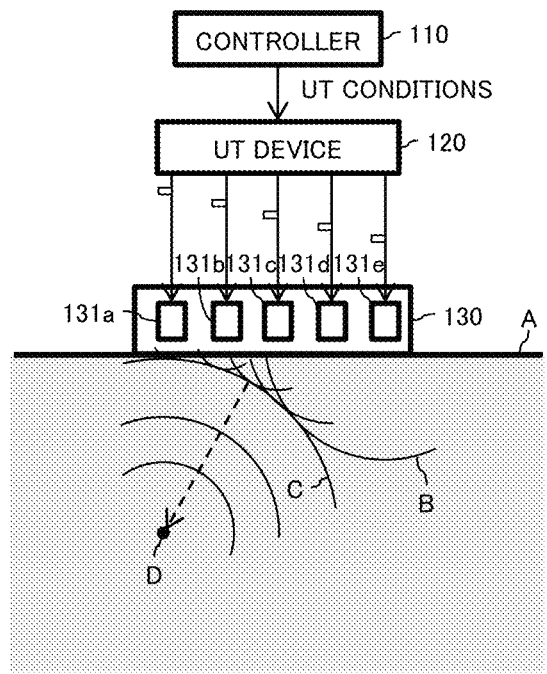
FIG. 2A is a diagram depicting principles of scanning in phased array UT.
Figure 2B:
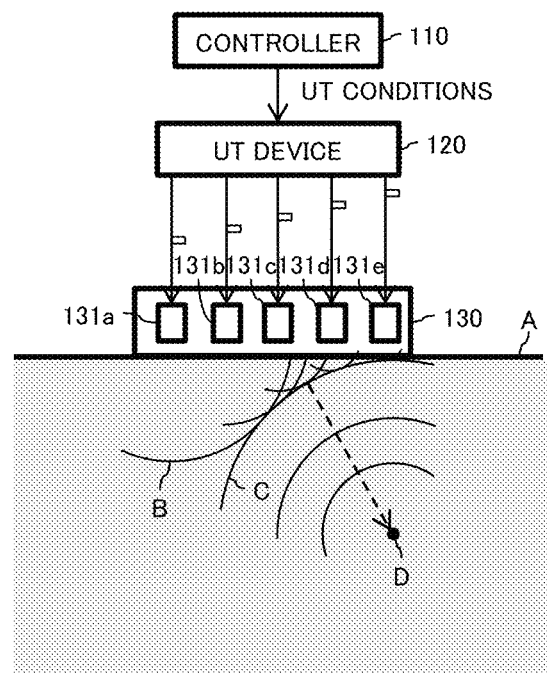
FIG. 2B is a diagram depicting principles of scanning in phased array UT.

FIG. 2A and FIG. 2B are diagrams depicting principles of scanning in phased array UT. As depicted in these figures, phased array UT scans the inside of the object A under inspection by moving the position (three-dimensional coordinates) of the focus D while changing the individual UT delay times. In the example depicted in FIG. 2A, the ultrasonic waves B are transmitted by the elements 131e, 131d, 131c, 131b, and 131a in this order, and consequently the focus D is displaced to a left side in the figure as compared with the example depicted in FIG. 1A. Conversely, in the example depicted in FIG. 2B, the ultrasonic waves B are transmitted by the elements 131a, 131b, 131c, 131d, and 131e in this order, and consequently the focus D is displaced to a right side in the figure as compared with the example depicted in FIG. 1A. As described earlier with reference to FIG. 1B, the addition of the reflected waves E received by the respective elements 131a to 131e is also performed with time differences. When the position of the focus D is thus moved and the focus D comes close to a flaw or the like within the object A under inspection, the strength of the received signals is increased. By thus obtaining the flaw detection data of the signal strength, it is possible to estimate the position, size, shape, and the like of the flaw or the like.

—UT System—

A UT system (phased array ultrasonic testing system) according to one embodiment of the present invention will be described.

In the system depicted in FIG. 1A and the like, when a large-sized array sensor including a number of elements 131 which number exceeds the number of input-output terminals of the UT device 120 is used as the sensor 130, all of the elements 131 of the sensor 130 cannot be used. In order to use all of the elements 131 of the sensor 130 in one time of UT, the UT device 120 needs to have a number of terminals (to be exact, a number of pulsers to be described later) which number is equal to or more than the number of elements 131. In this case, the larger the size of the sensor 130, the larger the number of terminals needed in the UT device 120. It is inefficient from a viewpoint of the number of man-hours and from an economic viewpoint to prepare a large-sized UT device including such a large number of input-output terminals on an as-needed basis according to the number of elements 131 of the sensor 130.

Figure 3:
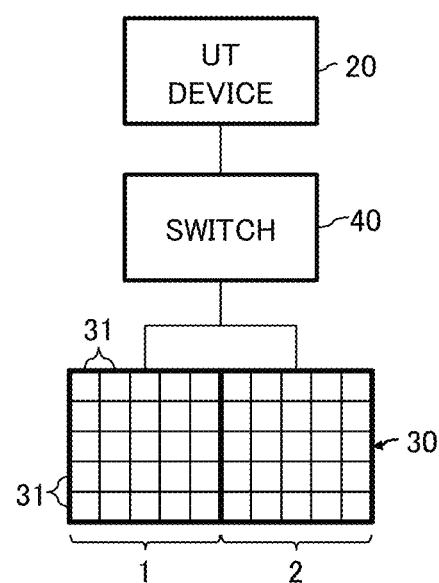
FIG. 3 is a schematic diagram of a UT system according to one embodiment of the present invention.

Accordingly, in the present embodiment, the sensor is connected to the UT device via a switch. FIG. 3 is a schematic diagram of a UT system according to the present embodiment. In the figure, a single sensor 30 (large-sized array sensor) having a larger number of elements 31 than the number of terminals of a UT device 20 is divided into a plurality of regions (two regions in the present example) 1 and 2, and elements to which the UT device 20 is connected can be switched between the regions 1 and 2 by a switch 40. All of the elements 31 of the sensor 30 can be selectively connected to a plurality of input-output terminals (preferably all of input-output terminals) of the UT device 20 via the switch 40. Incidentally, while FIG. 3 illustrates a case where the regions 1 and 2 are divided by a linear boundary line, it essentially suffices for the elements 31 to be divided into a plurality of groups. Thus, the boundary line between the regions adjacent to each other does not need to be linear, and a configuration in which the plurality of regions are interlaced with each other can also be adopted in some cases.

Figure 4A:
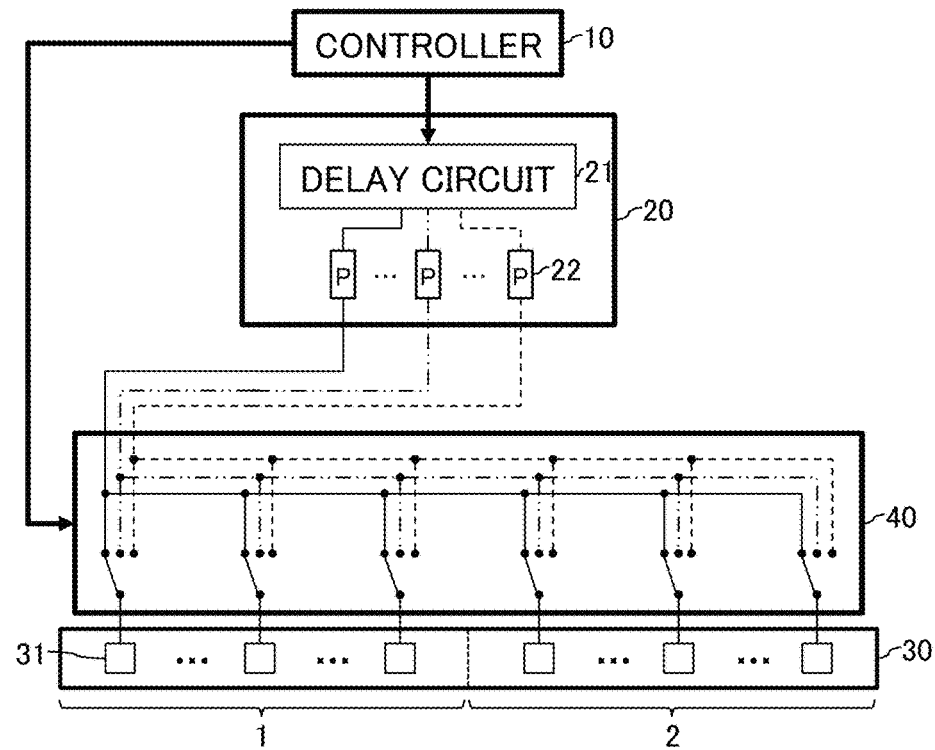
FIG. 4A is a block diagram of the UT system according to the embodiment of the present invention.
Figure 4B:
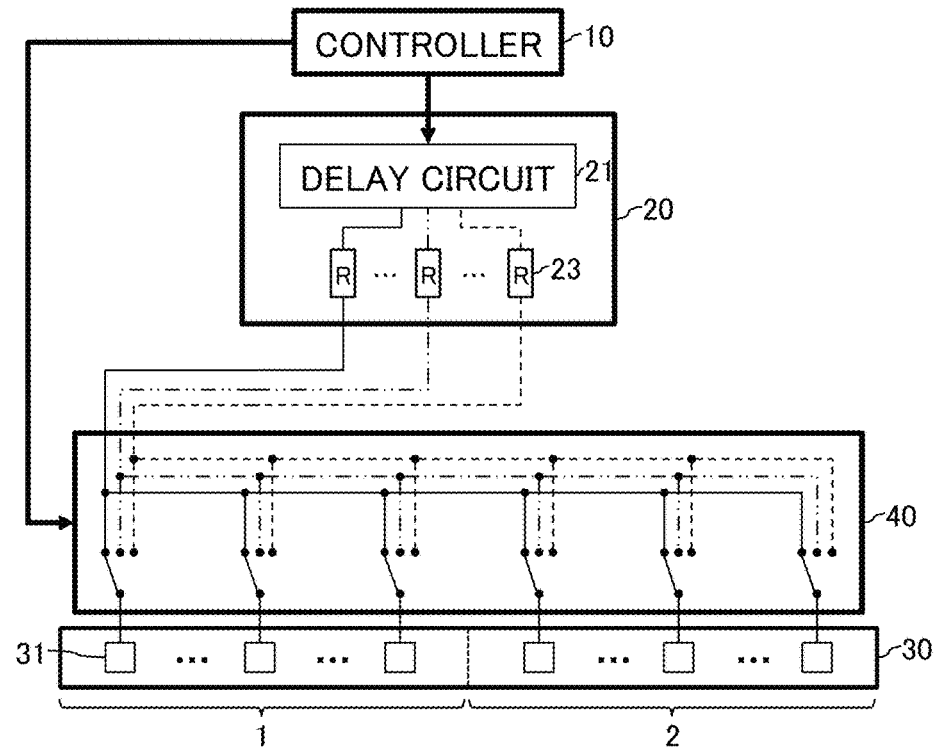
FIG. 4B is a block diagram of the UT system according to the embodiment of the present invention.

FIG. 4A and FIG. 4B are block diagrams of the UT system according to the present embodiment. FIG. 4A depicts connection relation between pulsers and ultrasonic elements. FIG. 4B depicts connection relation between receivers and the ultrasonic elements. As depicted in these figures, the UT system according to the present embodiment includes a controller 10, the UT device 20, the sensor 30, and the switch 40. The sensor 30 is a large-sized array sensor including a larger number of elements 31 than the number of input-output terminals of the UT device 20. The sensor 30 is installed on an object A under inspection (FIG. 1A and the like). The controller 10 controls the UT device 20 and the switch 40. A configuration and functions of the controller 10 will be described later.

A device similar to the UT device 120 depicted in FIG. 1A and the like (for example, a commercially available general-purpose device) can be used as the UT device 20. The UT device 20 includes a delay circuit 21, pulsers 22 (FIG. 4A), and receivers 23 (FIG. 4B). The pulsers 22, for example, include a D/A converter, and a plurality of pulsers 22 are included in the single UT device 20. Each of the pulsers 22 connects the delay circuit 21 and an output terminal (not depicted) of the UT device 20 to each other, converts a digital signal from the delay circuit 21 into a voltage signal, and outputs the voltage signal to the output terminal. The receivers 23 (FIG. 4A and the like) are, for example, an A/D converter, and a number of receivers 23 which number is equal to or more than that of the pulsers 22 are included in the single UT device 20. Each of the receivers 23 connects the delay circuit 21 and an input terminal (not depicted) of the UT device 20 to each other, converts a voltage signal input to the input terminal into a digital signal, and outputs the digital signal to the delay circuit 21.

The switch 40 is a device (for example, a multiplexer) that changes the connection relation of the pulsers 22 and the receivers 23 to the elements 31 of the sensor 30 by a relay circuit, for example. All of the ultrasonic wave transmitting terminals and ultrasonic wave receiving terminals of the UT device 20 are connected to terminals on one terminal side of the switch 40 in one-to-one relation, and the elements 31 of the sensor 30 are connected to terminals on another terminal side of the switch 40 in one-to-one relation. The switch 40 can selectively connect the individual pulsers 22 to at least one element 31 arbitrarily selected from among all of the elements 31. The switch 40 can similarly selectively connect the individual receivers 23 to at least one element 31 arbitrarily selected from among all of the elements 31. When there are a plurality of elements 31 having a same delay time (same ultrasonic wave transmission timing) in one time of UT, for example, the plurality of elements 31 can be connected to one output terminal of the UT device 20.

Figure 4C:
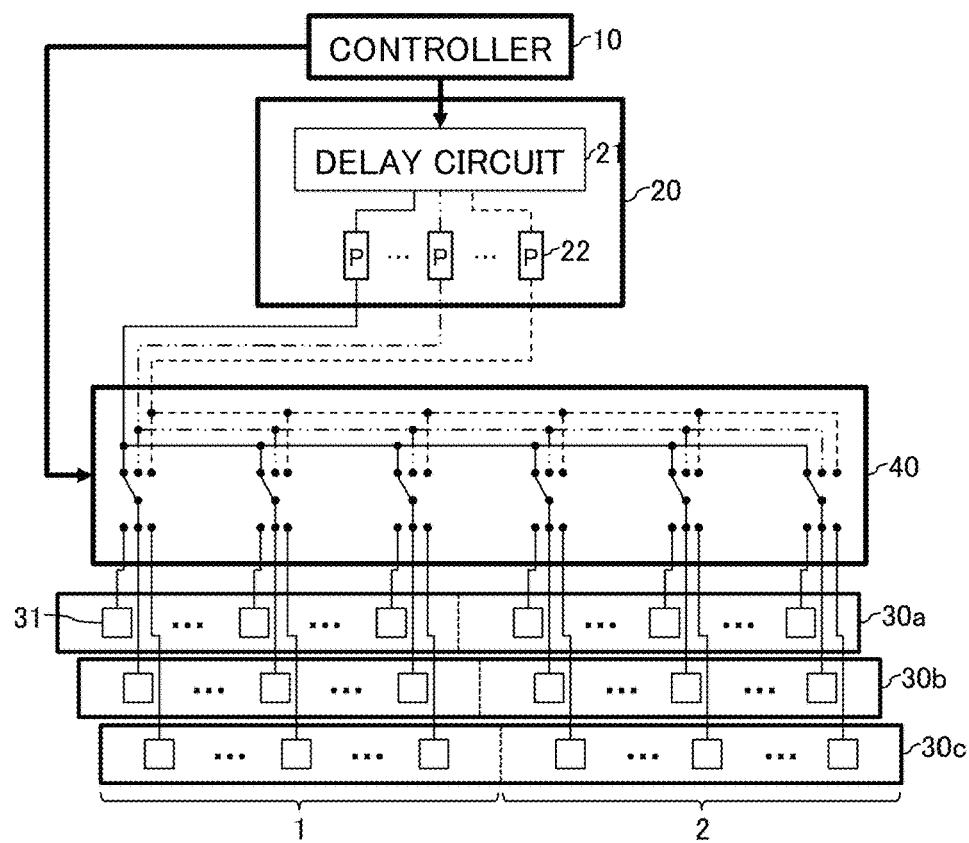
FIG. 4C is a block diagram of a UT system according to a modification of the embodiment of the present invention.
Figure 4D:
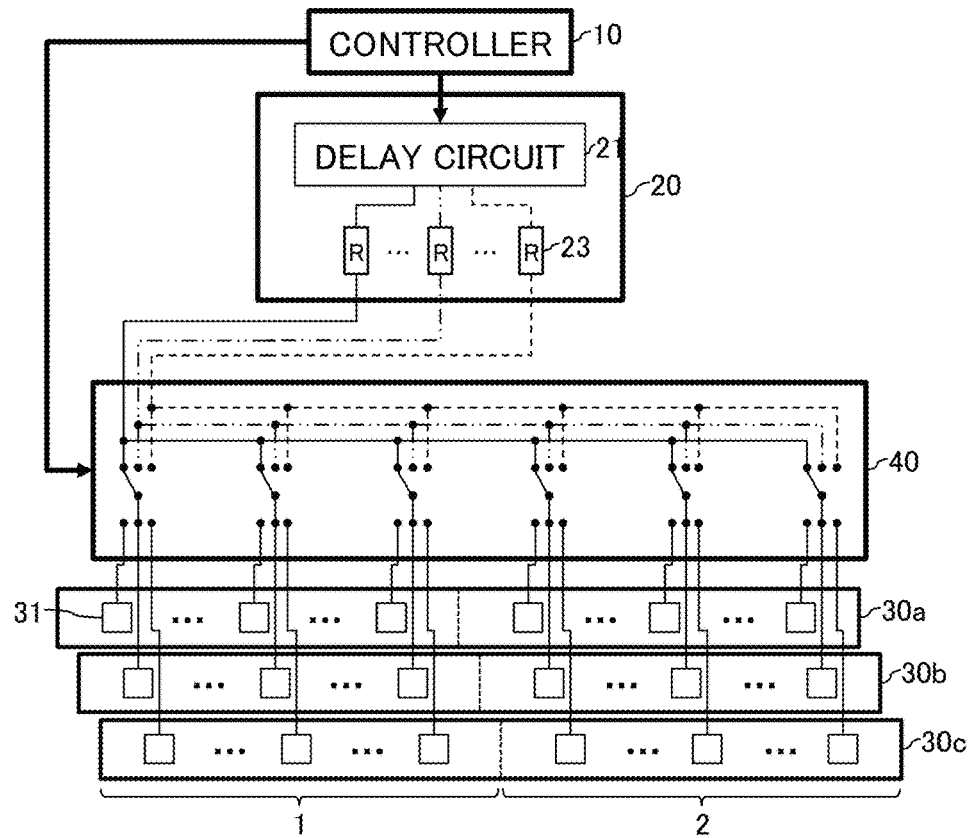
FIG. 4D is a block diagram of the UT system according to the modification of the embodiment of the present invention.

An example depicted in FIG. 4C and FIG. 4D is one modification in which the terminals of the switch 40 which terminals are connected to the elements of the sensor are each branched into a plurality of terminals and a plurality of large-sized sensors 30 are switchably connected. Such a configuration reduces the number of relay circuits even when a plurality of sensors are coupled. In the example of FIG. 4C and FIG. 4D, the switch 40 can selectively connect the individual pulsers 22 to at least one element 31 arbitrarily selected from among all of the elements 31 of a plurality of sensors 30a, 30b, and 30c. The switch 40 can similarly selectively connect the individual receivers 23 to at least one element 31 arbitrarily selected from among all of the elements 31 of the plurality of sensors 30a, 30b, and 30c. The switch 40 according to the modification of FIG. 4C and FIG. 4D may be formed by combining a plurality of switches.

Figure 5:
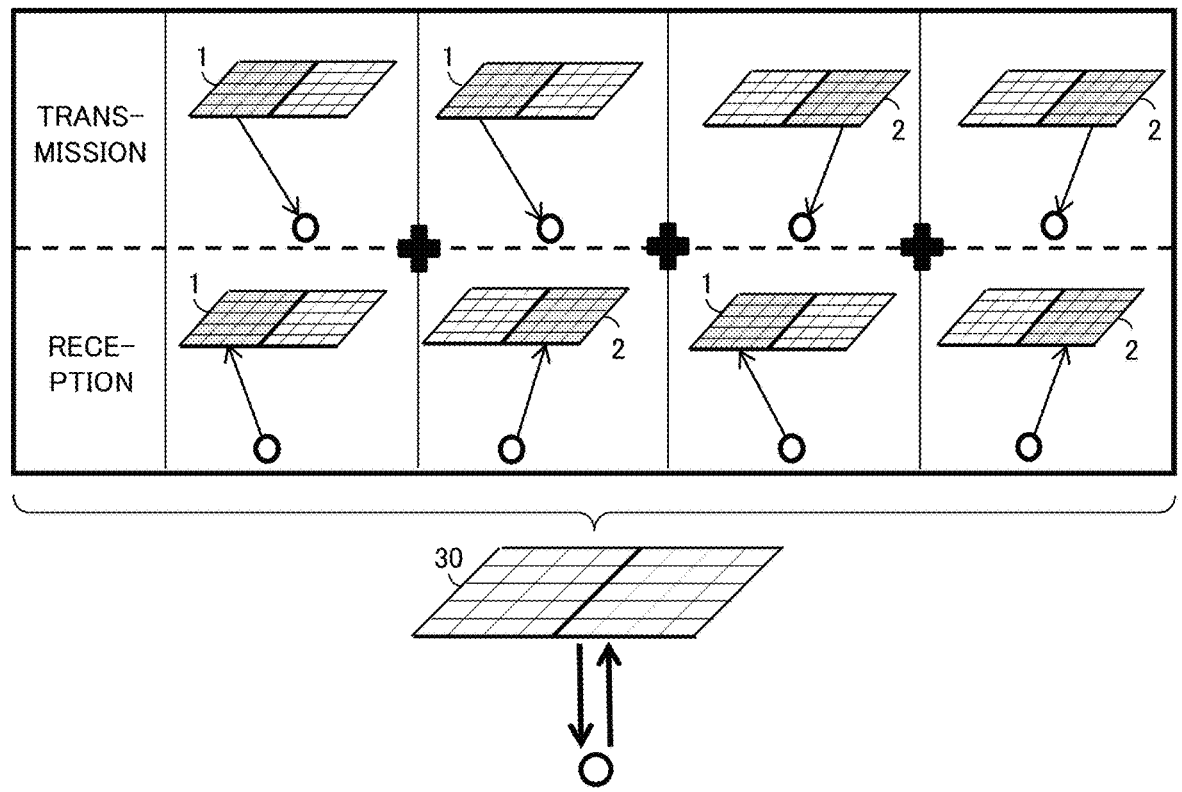
FIG. 5 is a diagram depicting a UT method for obtaining a detection sensitivity theoretically equal to that in a case of using a large-sized UT device in the UT system of FIG. 4A and FIG. 4B.

As depicted in FIG. 5, it is necessary to perform a plurality of times of UT and add together UT results (addition processing) in order for the UT system according to the present embodiment to obtain an inspection sensitivity theoretically equal to that in a case of using a large-sized UT device having a number of input-output terminals that can be connected to all of the elements 31 of the sensor 30 in one-to-one relation. Specifically, UT needs to be performed a number of times that is equal to the number of all combinations of the ultrasonic wave transmitting regions and ultrasonic wave receiving regions of the sensor 30, that is, a number of times that is the square of the number of divided regions of the sensor 30. In the case where the sensor 30 is divided into the two regions 1 and 2, four times of UT needs to be performed. In the present example, the following four times of UT, for example, are performed, and results of the four times of UT are subjected to addition processing.

First time: transmission from the region 1/reception in the region 1

Second time: transmission from the region 1/reception in the region 2

Third time: transmission from the region 2/reception in the region 1

Fourth time: transmission from the region 2/reception in the region 2

When the object A under inspection is made of a metal, ultrasonic waves within a metallic material are linearly independent, and thus a principle of superposition holds. Therefore, an inspection sensitivity equal to that in the case of using a large-sized UT device is obtained by adding together results of performing flaw detection while changing the elements 31 used for the transmission and reception. This signal processing is addition processing.

However, when the addition processing is performed, a number of times of UT which number is equal to the square of the number of divided regions of the sensor 30 need to be performed for one flaw detection point (focus) as described above. Therefore, the number of flaw detection points for which flaw detection can be performed under one group of UT conditions written at one time from the controller 10 to the UT device 20 is limited to one divided by the square of the number of regions of the sensor 30 (¼ in the case where the number of divisions is 2).

—Example of Application—

Figure 6:
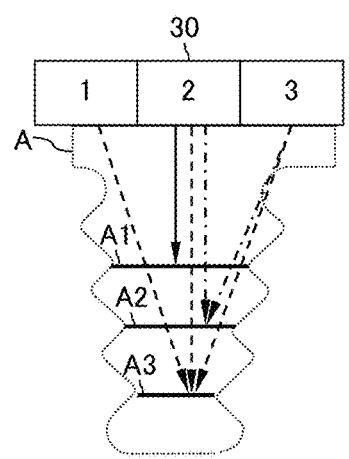
FIG. 6 is a diagram depicting an example of an inspection object to which a UT system according to a modification of the embodiment of the present invention can be suitably applied.

FIG. 6 is a diagram depicting an example of an inspection object to which the present embodiment can be suitably applied. An object A under inspection depicted in the figure is a base part of a rotor blade fitted to a turbine disk (not depicted) in a gas turbine or a steam turbine. Though a blade (vane part) of the rotor blade is not depicted, the blade actually extends from the top surface of the object A under inspection depicted in the figure to the outside in a radial direction of the turbine disk (upward direction in the figure). In the present example, the base part of a rotor blade of a type fitted to the turbine disk from an axial direction is illustrated. However, the UT device according to the present embodiment can perform flaw detection for the base part of a type inserted from the radial direction. The object A under inspection illustrated in FIG. 6 has a shape such that a plurality of projecting portions (hooks) projecting in a circumferential direction of the turbine disk are provided in a plurality of steps in the radial direction of the turbine disk. The object A under inspection is attached to the turbine disk by fitting these hooks. A high stress acts on a constricted part between projecting portions vertically adjacent to each other as turbine operation is performed. Thus, a plurality of cross sections passing through the constricted parts of the respective steps of the object A under inspection are set as inspection lines A1, A2, and A3 (a case where there are three inspection lines is illustrated in the present example), and UT is performed. When the object A under inspection in FIG. 6 is to be inspected, the sensor 30 is installed on the top surface of the object A under inspection as depicted in the figure so as to avoid the blade as appropriate. In this case, distances from the sensor 30 to the respective inspection lines A1 to A3 differ. In the present example, a case where the sensor 30 is divided into three regions 1, 2, and 3 is illustrated.

In the present embodiment, when the distances of a flaw detection point from the sensor 30 differ as in the present example, sensor regions and the number of regions to be used for UT are changed with attention directed to differences in reflection strength according to the distances. The shorter the distance of a flaw detection point reflecting a reflected wave from the sensor 30, the higher the strength of the reflected wave. For a flaw detection point corresponding to a high reflection strength, necessary and sufficient flaw detection accuracy can be ensured even when the addition processing is not performed on flaw detection data of all of the regions of the large-sized sensor 30. Hence, in the example of FIG. 6, for example, only one region is used in the sensor 30 for UT of the inspection line A1 nearest to the sensor 30, and two regions are used for the next nearest inspection line A2. For the inspection line A3 most distant from the sensor 30, all of the three regions are used to perform flaw detection surely. The number of times of addition processing is decreased by thus using only a part of the regions of the sensor 30 for a flaw detection point relatively near to the sensor 30. The number of times of addition processing can be further decreased by connecting a plurality of elements 31 having a same delay time to a same pulser 22 of the UT device 20. When flaw detection is performed in only a part of the regions of the sensor 30 as in the cases of the inspection lines A1 and A2, the regions to be selected depend on positional relation between the inspection line and each region. For example, a region that reduces an angle of incidence of an inspection wave is preferentially selected.

—Controller—

Figure 7:
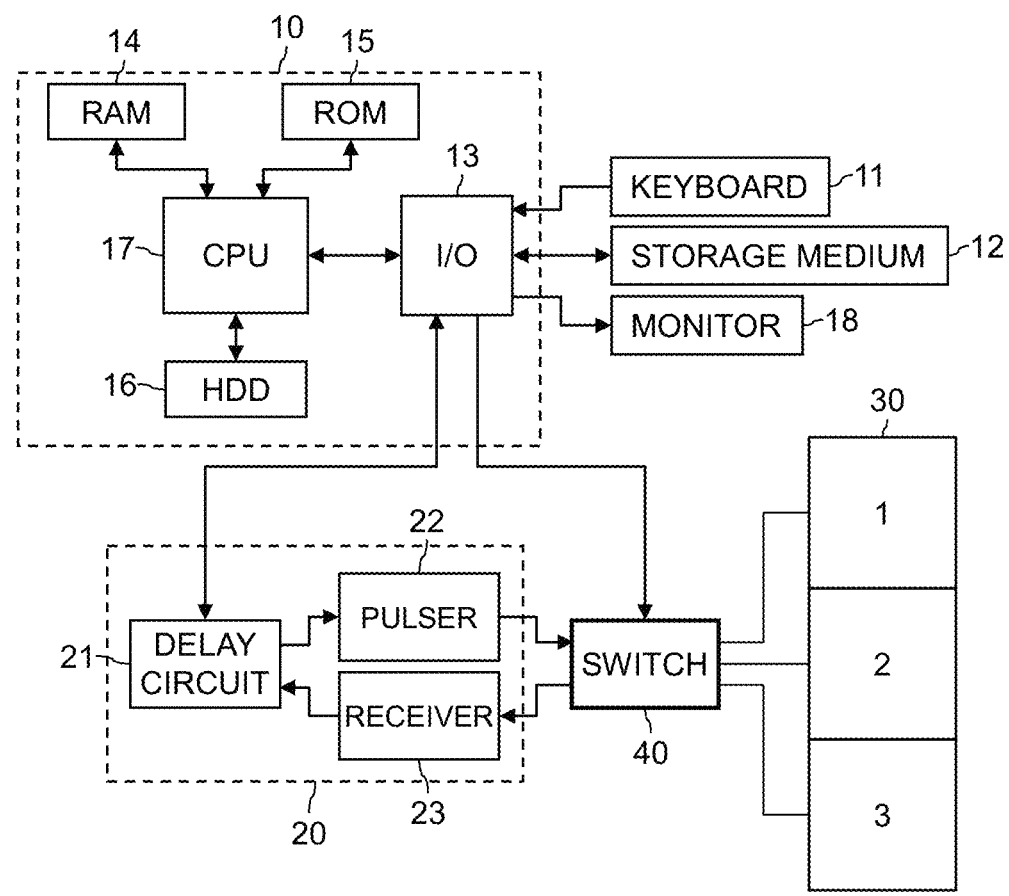
FIG. 7 is a block diagram of a controller included in the UT system according to the embodiment of the present invention.

FIG. 7 is a diagram depicting functional blocks of the controller included in the UT system according to the present embodiment together with related elements. The pulsers 22 and the receivers 23 are depicted collectively as one pulser and one receiver, respectively. The controller 10 in the present embodiment has a function of controlling the UT device 20 and the switch 40 according to a program (UT program to be described later) prepared in advance. The UT device 20 does not have a function of controlling the switch 40.

The controller 10 includes an input/output (I/O) port 13, a random access memory (RAM) 14, a read-only memory (ROM) 15, a hard disk drive (HDD) 16, and a central processing unit (CPU) 17. A personal computer (PC) can be used as the controller 10. The form of the computer is a desktop, a notebook type, a tablet type, or the like, and is not limited.

The I/O port 13 is a hardware interface of the controller 10. The UT device 20 and the switch 40 are connected to the controller 10 via the I/O port 13. The UT device 20 is connected to each of regions 1 to 3 of the sensor 30 via the switch 40. In addition, an input device such as a keyboard 11 or the like, a storage medium 12, and an output device such as a monitor 18 or the like are also connected to the controller 10 via the I/O port 13. When the monitor 18 is a touch panel type, the monitor 18 can serve also as an input device. As for the storage medium 12, a drive of the storage medium 12 may be connected to the I/O port 13, or the drive may be implemented in the controller 10. Usable as the storage medium 12 are disks such as a compact disc (CD), a digital versatile disc (DVD), a Blu-ray disc, and the like as well as various kinds of recording media such as a USB memory and the like that are connectable to the I/O port 13. In addition, as the output device, not only the monitor 18 but also a printer or the like can be connected to the I/O port 13. As for a connection system, a wired connection is assumed, but a wireless connection can also be adopted.

The RAM 14, the ROM 15, and the HDD 16 are storage devices implemented in the controller 10. Typical examples of the HDD 16 are a magnetic storage medium, a solid state drive (SSD), and the like. Flaw detection data input from the UT device 20 is recorded in at least one of these storage devices and the above-described storage medium 12. Suppose that a "storage device" simply described in the following refers to one or more of the RAM 14, the ROM 15, and the HDD 16. The above-described storage medium 12 is a recording medium not belonging to the UT system. In addition, the storage device stores a UT program (to be described later) that controls the UT system according to the present embodiment and performs phased array UT. The UT program may be programmed by using the controller 10. However, the UT program can be recorded on the storage medium 12 or a server on a network in advance, and installed in at least one of the RAM 14, the ROM 15, and the HDD 16.

The CPU 17 is an arithmetic processing device. The CPU 17 performs a function of controlling the UT device 20 and the switch 40 by reading the UT program from the storage device, executing the read UT program, and outputting commands to the UT device 20 and the switch 40.

—UT Program—

Procedures performed according to the above-described UT program include a data input procedure, a region selecting procedure, a delay time setting procedure, a switching procedure, a flaw detection procedure, an addition processing procedure, and an output procedure. These procedures are performed by the CPU 17 that reads the UT program from the storage device.

The data input procedure is a procedure of inputting data such as the shape of an object under inspection, the sonic speed of the object under inspection, the flaw detection position of the object under inspection, the installation position of the sensor, the number of elements of the sensor, element size, and the like. These pieces of data are input by the input device such as the keyboard 11 or the like, and stored in the storage device or the like.

The region selecting procedure is a procedure of selecting at least one sensor region to be used for UT from a plurality of regions (regions 1 to 3 in FIG. 7) for each flaw detection point according to the positional relation of the flaw detection position to the sensor 30. The reflection strength of a reflected wave from the flaw detection point is estimated from input data, the number of elements 31 necessary for flaw detection (detection of a crack) is calculated on the basis of the reflection strength, and the number of regions to be used is set accordingly. The reflection strength can be calculated from the angle of incidence of an ultrasonic wave incident on the flaw detection point and a propagation distance in consideration of the shape of the crack, the size of the crack, the orientation of a crack surface, and the like. The selected at least one region set here is output from the controller 10 to the output device, and is displayed on the monitor 18 for each position of the flaw detection point (a distance and an angle with respect to the sensor 30) as in an interface screen illustrated in FIG. 8, for example. The at least one region to be used for UT of each inspection point may be determined in advance, and input to the controller 10 by the keyboard 11, the storage medium 12, or the like.

The delay time setting procedure is a procedure of calculating timings of transmission and reception of ultrasonic waves of the elements 31 of the sensor regions to be used for UT of each flaw detection point. Delay times are calculated for each flaw detection point, and written collectively as one group of UT conditions to the delay circuit 21 of the UT device 20 via the I/O port 13. At this time, the UT conditions are also recorded in the storage device or the like when necessary.

The switching procedure is a procedure of switching the sensor 30 connected to the UT device 20 by controlling the switch 40 to connect the UT device 20 to the selected at least one region. The flaw detection procedure is a procedure of performing UT by commanding the UT device 20. This procedure is performed in synchronism with the switching procedure. The addition processing procedure is a step of performing addition processing of each flaw detection result when flaw detection is performed by using a plurality of sensor regions for a same flaw detection point. For a flaw detection point for which one region is selected, UT is performed by using the one selected region. For a flaw detection point for which a plurality of regions are selected, UT is performed a necessary number of times according to the number of regions by using the selected plurality of regions, and the results are subjected to addition processing. The output procedure is a procedure of recording flaw detection data in at least one of the storage device and the storage medium 12 or displaying the flaw detection data on the monitor 18.

—UT Method—

Figure 9:
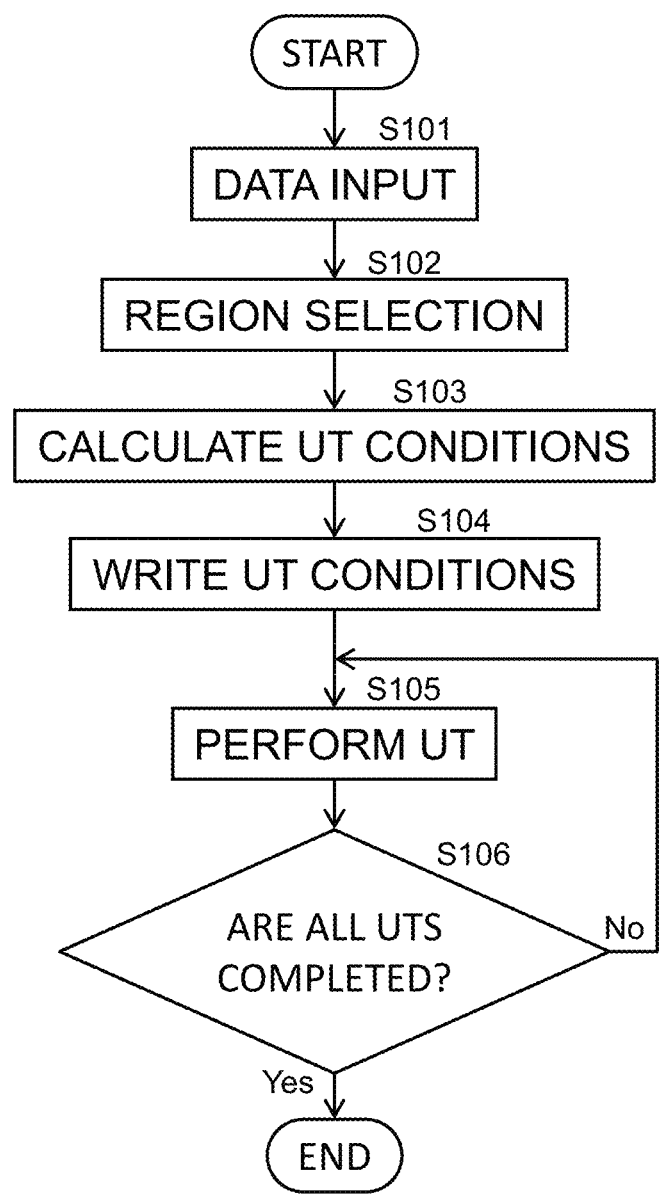
FIG. 9 is a flowchart depicting a UT procedure by the controller included in the UT system according to the embodiment of the present invention.

FIG. 9 is a flowchart depicting a UT procedure by the controller provided to the UT system according to the present embodiment. The UT procedure according to the present embodiment will be described as a UT method with reference to the figure.

In starting phased array UT according to the present embodiment, an operator first connects the controller 10, the UT device 20, the switch 40, and the sensor 30 to one another, and installs the sensor 30 on the object A under inspection. The operator then inputs data such as the shape of the object under inspection, the sonic speed of the object under inspection, a flaw detection position (a point or a region) in the object under inspection, the installation position of the sensor, the number of elements of each sensor, element size, and the like to the controller 10 by the input device such as the keyboard 11 or the like (S101). When the controller 10 is instructed to start UT by the input device such as the keyboard 11 or the like, the region selecting procedure (S102) and the delay time setting procedure (S103 and S104) described above are sequentially performed by the CPU 17 according to the UT program.

After writing of one group of UT conditions to the UT device 20 is completed, the CPU 17 performs the switching procedure and the flaw detection procedure described above (S105). The CPU 17 determines whether or not there is a UT not yet performed among the one group of UT conditions (S106), and repeats the procedure of S105 until there is no UT not yet performed. After completing all the UTs of the one group of UT conditions, the CPU 17 records flaw detection data in the storage device or the like, and ends the flow of FIG. 9. The flaw detection data recorded in the storage device or the like can be output as a flaw detection result to the output device such as the monitor 18 or the like according to instruction input of the operator which instruction input is given to the controller 10 via the input device.

—Effects—

In the present embodiment, the regions (that is, the elements 31 and the number thereof) to be used of the sensor 30 are changed according to the distance of the flaw detection point from the sensor 30. For example, only a part of the elements 31 of the sensor 30 are used for a flaw detection point that is at a short distance from the sensor 30 and for which flaw detection can be performed with a sufficient inspection sensitivity even when a large number of element 31 are not used. When the number of elements to be used is decreased according to the positional relation of the flaw detection point to the sensor 30, a certain inspection sensitivity can be ensured while the number of times of addition processing is decreased even in the case where the large-sized sensor 30 is connected to the general-purpose UT device 20. The number of focuses for which flaw detection can be performed under one group of UT conditions written to the UT device 20 at one time is thereby increased, so that UT by the large-sized sensor 30 can be performed efficiently by using the general-purpose UT device 20. Of course, for a flaw detection point distant from the sensor 30, all of the elements 31 are used, and thereby highly sensitive UT can be performed while making the most of the strength of the large-sized sensor 30. The number of times of addition processing can be further decreased by connecting a plurality of elements 31 having a same delay time, in particular, to a same pulser 22 of the UT device 20.

INDUSTRIAL APPLICABILITY

The present embodiment can provide the effects as described above by being applied to cases where the number of terminals of the UT device is insufficient as compared with the number of elements of the sensor irrespective of the inspection object. The present embodiment is, for example, applicable to inspection of a part to which a high stress is applied during operation in a turbine used for electric power generation or the like. It is necessary to avoid stopping the turbine used for a purpose of electric power generation for a long period, for example, and flaw detection needs to be performed in a short time. Applying the present embodiment in such a case and efficiently performing UT using a large-sized sensor can contribute also to shortening an operation stop time of the turbine. The present embodiment can be suitably applied to flaw detection for the base part of a rotor blade of the turbine, as described above.

What is claimed is:

1. An ultrasonic testing method comprising:
providing: i) a phased array ultrasonic testing device, ii) a switch connected to the phased array ultrasonic testing device, iii) an array sensor installed on an object under inspection, the array sensor including a plurality of ultrasonic elements, and iv) a controller configured to control the phased array ultrasonic device and the switch;
dividing the array sensor including a plurality of ultrasonic elements into a plurality of regions;
connecting the phased array ultrasonic testing device to each region of the array sensor via the switch;
selecting at least one region of the array sensor used for an ultrasonic testing from the plurality of regions for each flaw detection point according to a positional relation of the flaw detection point to the array sensor by the controller;
connecting the phased array ultrasonic testing device to the selected at least one region of the array sensor by controlling the switch with the controller;
for a flaw detection point for which one region is selected, performing the ultrasonic testing by using only the selected one region by controlling the phased array ultrasonic testing device and the switch with the controller; and
for a flaw detection point for which a plurality of regions are selected, performing the necessary number of times of ultrasonic testing according to a number of the regions by using only the selected plurality of regions, and adding strength signals of received reflected waves, by controlling the phased array ultrasonic testing device and the switch with the controller.

2. The ultrasonic testing method according to claim 1, wherein
a plurality of ultrasonic elements that transmit an ultrasonic wave in same timing in the ultrasonic testing performed for one flaw detection point are connected to a same terminal of the phased array ultrasonic testing device.

3. An ultrasonic testing system comprising:
a phased array ultrasonic testing device;
a switch connected to the phased array ultrasonic testing device;
an array sensor installed on an object under inspection, the array sensor including a plurality of ultrasonic elements; and
a controller configured to control the phased array ultrasonic testing device and the switch;
the array sensor being divided into a plurality of regions,
the phased array ultrasonic testing device being connected to each region of the array sensor via the switch,
the controller being configured to,
select at least one region of the array sensor used for an ultrasonic testing from the plurality of regions for each flaw detection point according to a positional relation of the flaw detection point to the array sensor,
connect the phased array ultrasonic testing device to the selected at least one region of the array sensor by the switch,
for a flaw detection point for which one region is selected, perform the ultrasonic testing by using only the selected one region by controlling the phased array ultrasonic testing device and the switch, and
for a flaw detection point for which a plurality of regions are selected, perform a necessary number of times of the ultrasonic testing according to a number of the regions by using only the selected plurality of regions, and add strength signals of received reflected waves, by separately controlling the phased array ultrasonic testing device and the switch.

4. The ultrasonic testing system according to claim 3, wherein
a plurality of ultrasonic elements that transmit an ultrasonic wave in same timing in the ultrasonic testing performed for one flaw detection point are connected to a same terminal of the phased array ultrasonic testing device.

5. The ultrasonic testing system according to claim 3, further comprising:
a monitor configured to display the selected at least one region.

* * * * *